United States Patent [19]

Gomi

[11] 4,327,373

[45] Apr. 27, 1982

[54] COMPOSITE COLOR SIGNAL PROCESSING CIRCUIT

[75] Inventor: Hiroshi Gomi, Fukaya, Japan

[73] Assignee: Tokyo Shibaura Electric Co., Ltd., Kawasaki, Japan

[21] Appl. No.: 64,528

[22] Filed: Aug. 7, 1979

Related U.S. Application Data

[63] Continuation of Ser. No. 842,323, Oct. 14, 1977, Pat. No. 4,227,205.

[30] Foreign Application Priority Data

Oct. 16, 1976 [JP]  Japan .............................. 51-123431

[51] Int. Cl.$^3$ ............................................. H04N 9/535
[52] U.S. Cl. ......................................... 358/28; 358/27
[58] Field of Search ............................. 358/27, 28, 19

[56] References Cited

U.S. PATENT DOCUMENTS

| | | | |
|---|---|---|---|
| 2,751,431 | 6/1956 | Kennedy | 358/19 |
| 3,368,030 | 2/1968 | Wiencek | 358/26 |
| 3,781,701 | 12/1973 | Cecchin et al. | 358/20 |

FOREIGN PATENT DOCUMENTS 38-22036  10/1963  Japan ................................. 358/27

*Primary Examiner*—John C. Martin
*Attorney, Agent, or Firm*—Cushman, Darby & Cushman

[57] ABSTRACT

A signal-processing circuit comprises a first gate circuit, a chrominance signal amplifier, a hue control circuit, means for reproducing a composite color signal, an AC coupling capacitor, and a second gate circuit. The first gate circuit receives a composite color signal consisting of chrominance signals and burst signals which are arranged alternately and then extracts the chrominance signals and burst signals from the composite color signal. The extracted chrominance signal is amplified by the chrominance signal amplifier, while the phases of the extracted burst signal is controlled by the hue control circuit. The outputs of the chrominance signal amplifier and the hue control circuit are added by said reproducing means, thereby reproducing a composite color signal. The AC coupling capacitor is coupled to the output of said means. The second gate circuit extracts from the output of the AC coupling capacitor chrominance signals and burst signals.

7 Claims, 7 Drawing Figures

F I G. 3
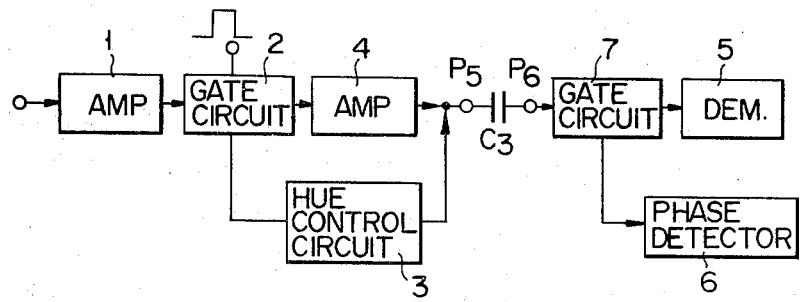

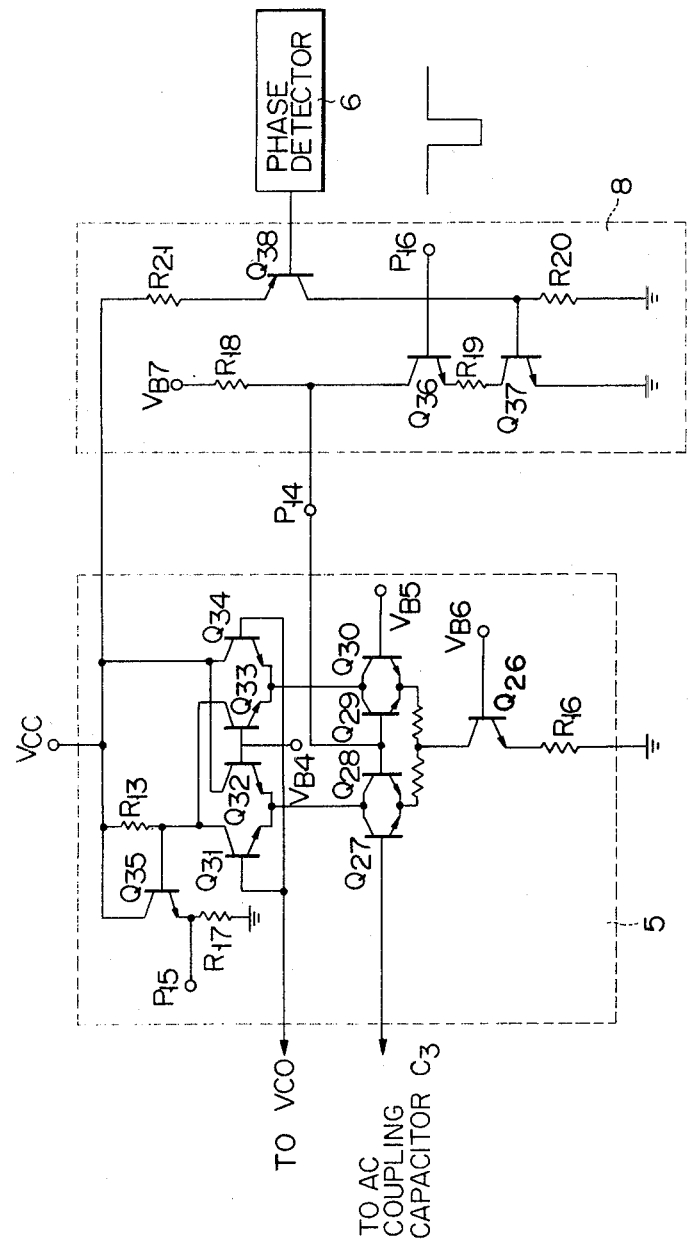
F I G. 5

COMPOSITE COLOR SIGNAL PROCESSING CIRCUIT

This is a continuation of application Ser. No. 842,323 filed Oct. 14, 1977, now U.S. Pat. No. 422,205.

This invention relates to an analog signal-processing integrated circuit which comprises various circuits formed on one chip and wherein the number of necessary terminal pins is reduced.

Generally, the more circuits are used to constitute an analog IC, the more transistors should be connected in cascade. The more transistors are connected in cascade, the more is varied the DC component of an analog signal. Thus, it is necessary to cut the DC transmission path at a point and to apply only the AC component of the analog signal to the succeeding stages. To apply the AC component of the analog signal alone, a capacitor of a large capacity should be used. But it is difficult to incorporate such a capacitor into an integrated circuit. Thus a capacitor of a large capacity should be connected to the external terminal pins of the analog IC. In consequence, the number of necessary terminal pins of the analog IC increased inevitably.

With reference to FIGS. 1 and 2 a conventional chrominance signal-processing circuit, an example of an analog IC used in TV sets, will be described. As shown in FIG. 1, the conventional chrominance signal-processing circuit comprises a composite color signal amplifier 1, a gate circuit 2, a hue control circuit 3, a chrominance signal amplifier 4, a demodulator 5 and a phase detector 6. The gate circuit 2 extracts a burst signal $e_b$ and a chrominance signal $e_c$ from an amplified chrominance signal $(e_b + e_c)$ from the amplifier 1 in response to a gate pulse generated in synchronism with the burst signal. The burst signal $e_b$ is supplied to the hue control circuit 3, while the chrominance signal $e_c$ is supplied to the chrominance signal amplifier 4, which controls the gain of the chrominance signal $e_c$. The phase detector 6 is to control a subcarrier wave oscillator (not shown) or to generate a control signal for automatic color control or color killer control.

The chrominance signal amplifier 4 and the hue control circuit 3 have output terminals $P_1$ and $P_3$, respectively. Similarly, the demodulator 5 and the phase detector 6 have input terminals $P_2$ and $P_4$, respectively. A capacitor $C_1$ is connected between the terminals $P_1$ and $P_2$, and another capacitor $C_2$ between the terminals $P_3$ and $P_4$. Both capacitors acts as AC coupling elements.

Each of demodulator 5 and phase detector 6 usually includes such differential amplifiers of double balanced type as illustrated in FIG. 2. More specifically, transistors $Q_1$ and $Q_2$ constitute a differential amplifier, transistors $Q_3$ and $Q_4$ another differential amplifier, and transistors $Q_5$ and $Q_6$ still another differential amplifier. The emitters of the transistors $Q_3$ and $Q_4$ are connected to the collector of the transistor $Q_1$, the emitters of the transistors $Q_5$ and $Q_6$ to the collector of the transistor $Q_2$, and the emitters of the transistors $Q_1$ and $Q_2$ to a current source $I_o$. The collectors of the transistors $Q_3$ and $Q_5$ are connected to a power source $V_{cc}$ through a load resistor $R_1$. The collectors of the transistors $Q_4$ and $Q_6$ are connected also to the power source $V_{cc}$. To one end of the resistor $R_1$ there is connected an output terminal $P_{11}$.

A burst signal $e_b$ or a chrominance signal $e_c$ is supplied to the base terminal $P_7$ of the transistor $Q_1$ and/or the base terminal $P_8$ of the transistor $Q_2$. Subcarrier waves are supplied to the common base terminal $P_9$ of the transistors $Q_3$ and $Q_6$ and/or the common base terminal $P_{10}$ of the transistors $Q_4$ and $Q_5$. If a circuit in the preceding stage is connected to the base terminals $P_7$ and $P_8$, the voltage across the terminals $P_7$ and $P_8$, i.e. DC bias on the differential amplifier constituted by the transistors $Q_1$ and $Q_2$, will be lowered. As a result, the maximum amplitude of an input signal will be limited, or the voltage at the output terminal $P_{11}$ will vary. Consequently, the demodulator 5 may change the color of the background on the TV screen, and the phase detector 6 may eventually vary the frequency of the subcarrier waves from the subcarrier wave oscillator (not shown).

To avoid the variation of the voltage across the terminals $P_7$ and $P_8$, an AC coupling capacitor is connected to the terminal $P_7$ or $P_8$. The conventional chrominance signal-processing circuit shown in FIG. 1, which controls chrominance signals (first signals) and burst signals (second signals) alternately transmitted in time-share fashion, requires two AC coupling capacitors, i.e. capacitors $C_1$ and $C_2$. In case the signal-processing circuit is used in a TV set, the capacitors $C_1$ and $C_2$ should have such a large capacity as would provide a sufficiently small impedance to the TV signal frequency, e.g. 3.58 MHz. With such a large capacity, the capacitors $C_1$ and $C_2$ can hardly be made into an integrated circuit. For this reason they should be arranged outside the signal-processing circuit which is an IC. In conventional circuit the signal-processing circuit should therefore be provided with four external terminal pins $P_1$ to $P_4$. A large number of pins is one of the factors which make it difficult to incorporate various circuits into an integrated circuit. If four terminal pins $P_1$ to $P_4$ are used merely to allow the use of two AC coupling capacitors, it means that the pins $P_1$ to $P_4$ are not used effectively.

The object of this invention is to provide a signal-processing circuit which comprises various circuits performing different functions and wherein the number of necessary terminal pins is reduced thereby to make it easier to incorporate the various circuits into an integrated circuit.

According to one aspect of this invention there is provided a signal-processing circuit comprising signal-separating means for separating and extracting a first signal and a second signal from a multiplex signal; a gain control circuit for controlling the gain of the first signal from said signal-separating means; a phase control circuit for controlling the phase of the second signal from said signal-separating means; means for synthesizing the outputs of said gain control circuit and said phase control circuit to form a time-shared type signal; and an AC coupling capacitor for supplying the time-shared type signal from said signal-synthesizing means to a circuit in the next stage.

This invention can be more fully understood from the following detailed description when taken in conjunction with the accompanying drawings, in which:

FIG. 3 shows a block diagram of a signal-processing circuit according to one embodiment of this invention;

FIG. 5 is a circuit diagram of a color killer circuit;

Figure 1:
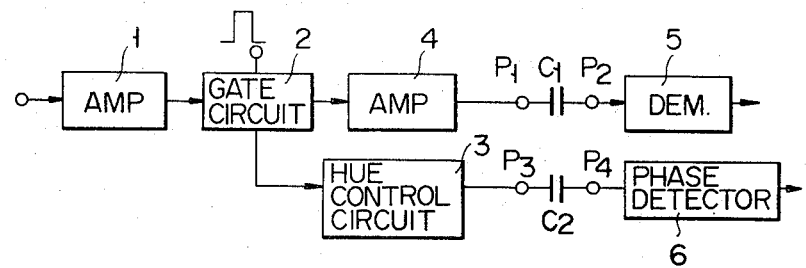
FIG. 1 is a block diagram of a conventional signal-processing circuit.

As shown in FIG. 3, an embodiment of the signal-processing circuit according to this invention comprises a composite color signal amplifier 1, a first gate circuit 2, a hue control circuit 3, a second chrominance signal amplifier 4, a demodulator 5, a phase detector 6 and a second gate circuit 7. The first gate circuit 2 separates a chrominance signal $e_c$ and a burst signal $e_b$ when a gate pulse is applied to the first gate circuit 2. The hue control circuit 3 and the chrominance signal amplifier 4 have a common output terminal $P_5$, and the second gate circuit 7 has an input terminal $P_6$. Between the terminals $P_5$ and $P_6$ there is connected an AC coupling capacitor $C_3$.

Unlike in the conventional signal-processing circuit of FIG. 1, the outputs of the hue control circuit 3 and second chrominance circuit 4 are synthesized at the output terminal $P_5$ to form a sum signal ($e_c + e_b$), which is supplied to the second gate circuit 7 through the capacitor $C_3$. That is, the sum signal consisting of a chrominance signal $e_c$ and a burst signal $e_b$ passes through the capacitor $C_3$, and the chrominance signal $e_c$ separated again from the burst signal $e_b$ by the second gate circuit 7. The chrominance signal $e_c$ is then supplied to the demodulator 5, and the burst signal $e_b$ to the phase detector 6. Instead, to the capacitor $C_3$ there may be connected two gate circuits, one for extracting the chrominance signal from the sum signal and the other for extracting the burst signal from the sum signal.

As shown in FIG. 3, the signal-processing circuit requires but a single AC coupling capacitor in order to supply a chrominance signal $e_c$ and a burst signal $e_b$, which have undergone a specific control, to the demodulator 5 and the phase detector 6, respectively. Provided with only one AC coupling capacitor, the signal-processing circuit requires only two terminal pins. Indeed the second gate circuit 7 is an additional element, and it changes little the DC component of the sum signal. Thus the operation of the demodulator 5 or the phase detector 6 is hardly affected by the variation of the DC component. Further, the hue control may be effected by subcarrier wave signals instead of burst signals $e_b$ from the first gate circuit 2. The hue control can be carried out even if the second chrominance signal amplifier 4 is not provided.

Figure 4:
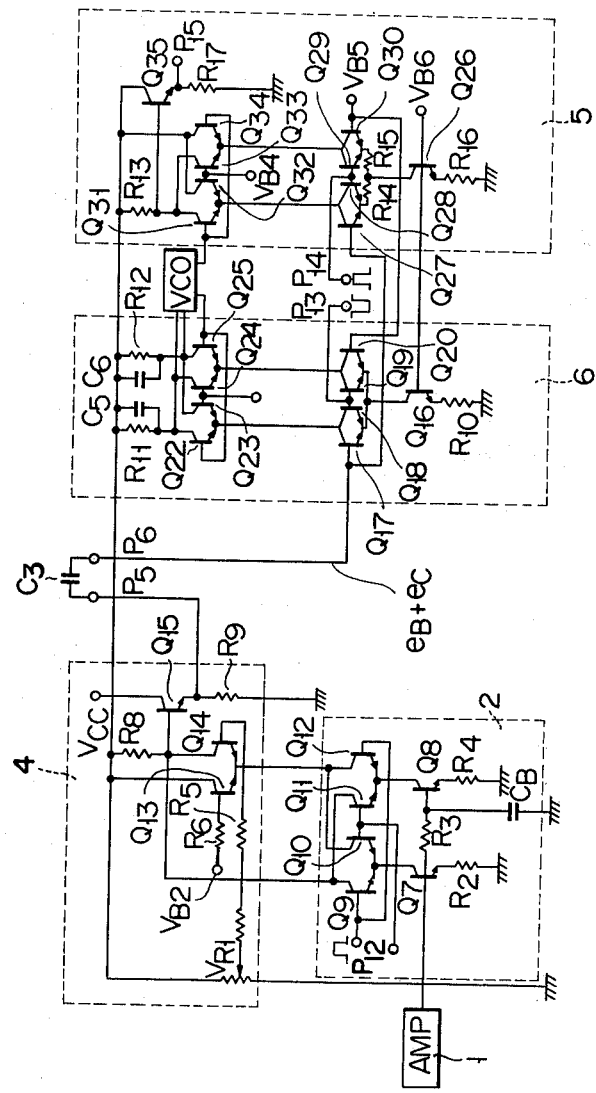
FIG. 4 is a concrete circuit diagram of the signal-processing circuit shown in FIG. 3 but without hue control 3.

A concrete circuit diagram of one embodiment of this invention is shown in FIG. 4, which is not provided with a hue control circuit corresponding to the hue control circuit amplifier 3 of the circuit shown in FIG. 3. This embodiment comprises a composite color signal amplifier 1, a first gate circuit 2, a chrominance signal amplifier 4, an AC coupling capacitor $C_3$, a demodulator 5 and a phase detector 6. The demodulator 5 denotes only one demodulated axis, and the phase detector 6 actuates a voltage-controlled oscillator VCO.

In the signal-processing circuit of FIG. 4, the gate circuit 2 is constituted by a by-pass capacitor $C_B$, transistors $Q_7$ and $Q_8$, resistors $R_2$ to $R_4$, a differential amplifier of double balanced type comprised of transistors $Q_9$ to $Q_{12}$, and a base terminal $P_{12}$ connected to the bases of the transistors $Q_9$ and $Q_{12}$. The gate circuit 2 separates a burst signal $e_b$ from a composite color signal ($e_b + e_c$) when a gate pulse is applied to the terminal $P_{12}$. The phase detector 6 is constituted by transistors $Q_{16}$ to $Q_{20}$ and $Q_{22}$ to $Q_{25}$, resistors $R_{10}$ to $R_{12}$ and capacitors $C_5$ and $C_6$. The chrominance signal amplifier 4 is constituted by transistors $Q_{13}$ to $Q_{15}$, resistors $R_5$ to $R_8$ and a variable resistor $RV_1$. The demodulator 5 is constituted by transistors $Q_{26}$ to $Q_{35}$ and resistors $R_{13}$ to $R_{17}$. The gate circuit 2 chrominance signal amplifier 4, demodulator 5 and phase detector 6 are of well-known type, and their constructions are not described here in detail.

A processed composite signal ($e_b + e_c$) from the chrominance signal amplifier 1 is applied to the base of the transistor $Q_7$ of the gate circuit 2. But the base of the transistor $Q_8$ is DC-biased by the by-pass capacitor $C_B$. The collectors of the transistors $Q_{10}$ and $Q_{12}$ are connected to the junction between the emitters of the transistors $Q_{13}$ and $Q_{14}$ of the chrominance signal amplifier, and the collectors of the transistors $Q_9$ and $Q_{11}$ to the base of transistor $Q_{15}$ of the chrominance signal amplifier 4.

When a gate pulse is applied to the terminal $P_{12}$, the transistors $Q_9$ and $Q_{12}$ of the gate circuit 2 are rendered conductive. The transistors $Q_9$ and $Q_{12}$ remain conductive for a burst period, during which time a burst signal $e_b$ is extracted from the composite color signal ($e_b + e_c$) and supplied to the base of the transistor $Q_{15}$ through the transistor $Q_9$. During a chrominance signal period the transistors $Q_{10}$ and $Q_{11}$ remain conductive and a chrominance signal $e_c$ is supplied to the emitters of the transistor $Q_{13}$ and $Q_{14}$ through the transistor $Q_{10}$. The chrominance signal $e_c$ is supplied further to the base of the transistor $Q_{15}$ which is connected to the resistor $R_8$.

The ratio of the current flowing through the transistor $Q_{14}$ and the current flowing through the transistor $Q_{13}$ is controlled by the variable resistor $VR_1$. The chrominance signal $e_c$ which has passed through the transistor $Q_{14}$ is supplied to the transistor $Q_{15}$. In this way the color gain of the chrominance signal $e_c$ is controlled.

The transistor $Q_{15}$ and the resistor $R_9$ of the chrominance signal amplifier 4 from a emitter follower. The chrominance signal $e_c$ which has undergone no amplitude control and the burst signal $e_b$ which has undergone no amplitude control appear alternately in time-share fashion at the output terminal $P_5$ of the chrominance signal amplifier 4. These signal $e_c$ and $e_b$ are supplied through the AC coupling capacitor $C_3$ to the phase detector 6 and the demodulator 5. The sum signal ($e_c + e_b$) is applied to the base of the transistor $Q_{17}$ of the phase detector 6 and to the base of the transistor $Q_{27}$ of the demodulator 5.

In the phase detector 6, the transistor $Q_{17}$ to $Q_{20}$ constitute a differential amplifier. The transistors $Q_{18}$ and $Q_{19}$ have their bases connected mutually, their emitters connected to the emitter of the transistor $Q_{17}$ and the emitter of the transistor $Q_{20}$, respectively, and their collectors connected to the collector of the transistor $Q_{17}$ and the collector of the transistor $Q_{20}$, respectively. The bases of the transistors $Q_{18}$ and $Q_{19}$ are connected to a terminal $P_{13}$. When a negative gate pulse is applied to the terminal $P_{13}$, the transistors $Q_{18}$ and $Q_{19}$ become inconductive and the transistors $Q_{17}$ and $Q_{20}$ become conductive, whereby the phase detector 6 comes into operation. Namely, the phase detector 6 operates during the burst signal period and remains inoperative during the other period.

In the demodulator 5, the transistors $Q_{27}$ to $Q_{30}$ constitute a differential amplifier. The transistors $Q_{28}$ and $Q_{29}$ have their bases connected mutually, their emitters connected to the emitter of the transistor $Q_{27}$ and the emitter of the transistor $Q_{30}$, respectively, and their collectors connected to the collector of the transistor $Q_{27}$ and the collector of the transistor $Q_{30}$, respectively. The bases of the transistors $Q_{28}$ and $Q_{29}$ are connected to a terminal $P_{14}$. To the terminal $P_{14}$ a positive gate pulse is applied. When a positive gate pulse synchronized with the negative gate pulse is applied to the terminal $P_{14}$, the transistors $Q_{28}$ and $Q_{29}$ become conductive and the transistors $Q_{27}$ and $Q_{30}$ become inconductive. As a result, a burst signal $e_b$ is shut off. While no burst signal $e_b$ is applied to the transistor $Q_{27}$, the transistors $Q_{27}$ and $Q_{30}$ remains conductive. That is, during the chrominance signal period these transistors are conductive, thereby to demodulate the chrominance signal $e_c$. Thus, the demodulator 5 operates during the chrominance signal period, while the phase detector 6 operates during the burst signal period.

Figure 2:
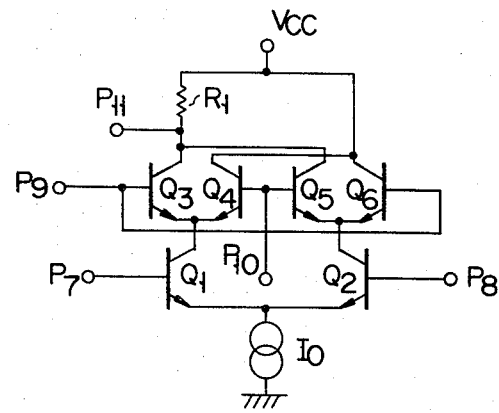
FIG. 2 is a circuit diagram of one example of a phase detecting circuit shown in FIG. 1.

The gate pulse used in the conventional signal-processing circuit as shown in FIGS. 1 and 2 is a flyback pulse or a horizontal synchronizing signal. A horizontal synchronizing signal is preferred because it has a stable phase relationship with a burst signal $e_b$. In a weak electric field, however, a horizontal synchronizing signal contains noise and in some cases it fails to perform a perfect gating operation. As a result, a chrominance signal $e_c$ may erroneously enter the hue control circuit 3 during the chrominance signal period. If this happens, color killer control should be carried out in the demodulator 5 or the phase detector 6.

FIG. 5 shows another embodiment of this invention which differs from the signal-processing circuit of FIG. 4 only in that color killer control circuit 8 is connected between demodulator 5 and a phase detector 6. The color killer control circuit 8 is constituted by transistor $Q_{36}$ to $Q_{38}$ and resistors $R_{18}$ to $R_{21}$. The output of the phase detector 6 is coupled to the base of the PNP transistor $Q_{38}$, the emitter of which is connected to a power source $V_{cc}$ through the resistor $R_{21}$. The collector of the transistor $Q_{38}$ is grounded through the resistor $R_{20}$ and connected to the base of the transistor $Q_{37}$. The emitter of the transistor $Q_{37}$ is grounded, and the collector thereof is connected to the emitter of the transistor $Q_{36}$ via the resistor $R_{19}$. The collector of the transistor $Q_{36}$ is connected to a voltage source $V_{B7}$ through the resistor $R_{18}$ and further to the terminal $P_{14}$ of the demodulator 5. The base of the transistor $Q_{36}$ is connected to a terminal $P_{16}$, to which a negative gate pulse is applied.

In a sufficient electric field, the transistor $Q_{38}$ is conductive, and a current flows through the resistor $R_{20}$. Thus the transistor $Q_{37}$ is saturated, and the resistor $R_{19}$ is equivalently grounded. As a result, the transistor $Q_{36}$ comes into operation to supply a positive gate pulse to the terminal $P_{14}$ of the demodulator 5. In a weak electric field, the transistor $Q_{38}$ is nonconductive, and no current flows through the resistor $R_{20}$. The transistor $Q_{37}$ is therefore turned off, and then the transistor $Q_{36}$ is turned off, too, whereby the positive gate pulse is not supplied to the terminal $P_{14}$ of the demodulator 5. Eventually the potential at the terminal $P_{14}$ reaches the value at the voltage source $V_{B7}$, and the transistors $Q_{28}$ and $Q_{29}$ of the demodulator 5 remain conductive thereafter, whereby color killer operation is carried out.

Figure 6:
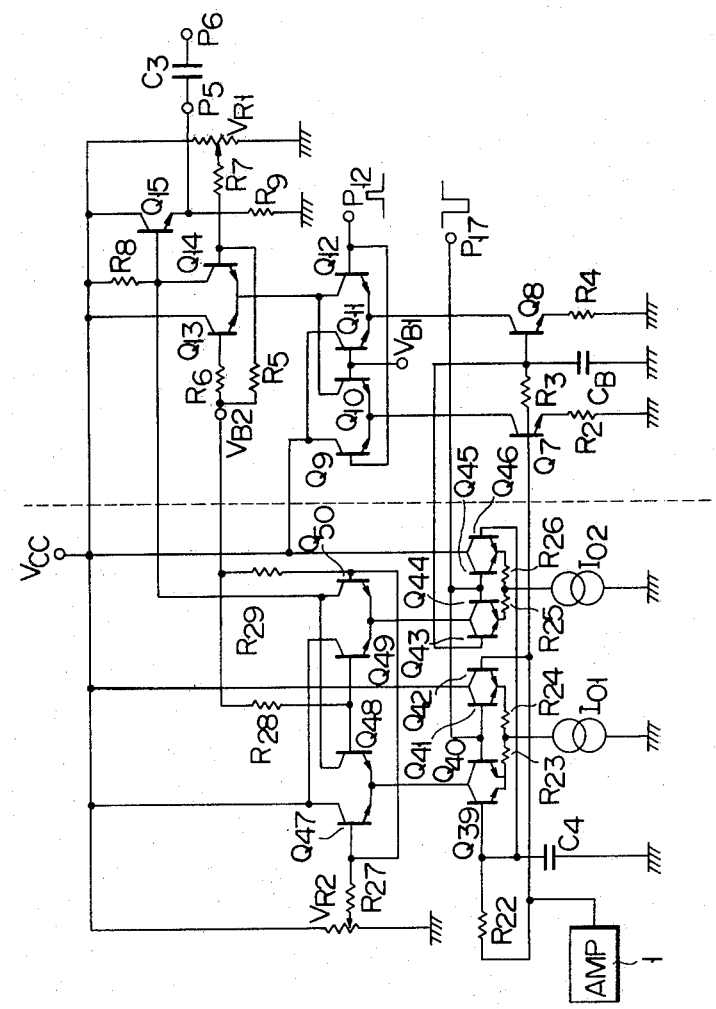
FIG. 6 is a circuit diagram showing another embodiment of this invention.

FIG. 6 shows a further embodiment of this invention, which differs from the signal-processing circuits shown in FIG. 4 in that it has further a hue control circuit. The circuit of FIG. 6 is divided into two parts by a dotted line. The right part is identical with the combination of the gate circuit 2 and the chrominance signal amplifier 4 of the signal-processing circuit shown in FIG. 4, except that the collectors of transistors $Q_9$ and $Q_{11}$ are connected to a power source $V_{cc}$.

In the left part of the circuit of FIG. 6, the output of a composite color signal amplifier 1 which amplifies both a burst signal $e_b$ and a chrominance signal $e_c$ is coupled to the bases of transistors $Q_{39}$ and $Q_{46}$ through a resistor $R_{22}$. The base of the transistor $Q_{39}$ is grounded through a capacitor $C_4$. Thus, the resistor $R_{22}$ and the capacitor $C_4$ constitute a phase delay circuit. The output of the composite color signal amplifier 1 is supplied also to the base of a transistor $Q_{42}$ and further to the base of a transistor $Q_7$. The emitter of the transistor $Q_{39}$ is connected to the emitter of a transistor $Q_{40}$. The emitters of these transistors $Q_{39}$ and $Q_{40}$ are connected to a current source $I_{o1}$ through a resistor $R_{23}$. The other end of the current source $I_{o1}$ is grounded. The emitters of a pair of transistors $Q_{41}$ and $Q_{42}$ are mutually connected and are connected to the current source $I_{o1}$ through a resistor $R_{24}$. The emitters of another pair of transistors $Q_{43}$ and $Q_{44}$ are mutually connected and are coupled to a current source $I_{o2}$ through a resistor $R_{25}$. Similarly, the emitters of another pair of transistors $Q_{45}$ and $Q_{46}$ are mutually connected and are coupled to the current source $I_{o2}$ through a resistor $R_{26}$.

The base of the transistor $Q_{43}$ is connected to the base of a transistor $Q_8$, while the bases of the transistors $Q_{40}$, $Q_{41}$, $Q_{44}$ and $Q_{45}$ are connected to a terminal $P_{17}$, to which a gate pulse is applied. The collectors of the transistors $Q_{39}$ and $Q_{40}$ are mutually connected to the junction between the emitters of a pair of transistors $Q_{47}$ and $Q_{48}$. The collectors of the transistors $Q_{41}$ and $Q_{42}$ are mutually connected and are coupled to the power source $V_{cc}$ through a resistor $R_{30}$ and also to a terminal $P_{18}$. The collectors of the transistors $Q_{43}$ and $Q_{44}$ are mutually connected and are coupled to the junction between the emitters of a pair of transistors $Q_{49}$ and $Q_{50}$. The collectors of the transistors $Q_{45}$ and $Q_{46}$ are mutually connected and are coupled to the power source $V_{cc}$.

The bases of the transistors $Q_{47}$ and $Q_{50}$ are mutually connected and coupled to a voltage source $V_{B2}$ through a resistors $R_{29}$ and to a DC control variable resistor $VR_2$ through a resistor $R_{27}$. The bases of the transistors $Q_{48}$ and $Q_{49}$ are mutually connected and coupled to the voltage source $V_{B2}$ through a resistor $R_{28}$. The collectors of the transistors $Q_{47}$ and $Q_{49}$ are mutually connected and coupled to the power source $V_{cc}$, while the collectors of the transistors $Q_{48}$ and $Q_{50}$ are mutually connected and coupled to the base of a transistor $Q_{15}$.

It will be described how hue control is carried out by the circuit of FIG. 6, with reference to FIG. 7.

Figure 7:
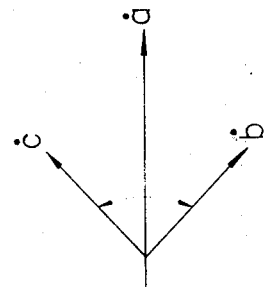
FIG. 7 shows a vector diagram for explaining the operation of the circuit shown in FIG. 6.

Suppose the output signal of the composite color signal amplifier 1 is vector $\overset{\circ}{a}$ as shown in FIG. 7 and applied to the bases of the transistors $Q_{42}$ and $Q_7$. If the phase of the output signal is delayed by, for example, 45° by the phase delay circuit constituted by the resistor $R_{22}$ and the capacitor $C_4$, vector $\overset{\circ}{a}$ will be converted into such vector $\overset{\circ}{b}$ as illustrated in FIG. 7.

When a gate pulse is applied to the terminal $P_{17}$, the transistors $Q_{40}$, $Q_{41}$, $Q_{44}$ and $Q_{45}$ are rendered inconductive, while the transistors $Q_{39}$ and $Q_{42}$ start operating as a differential amplifier and the transistors $Q_{43}$ and $Q_{46}$ start operating as a differential amplifier. If a difference between vectors $\overset{\circ}{a}$ and $\overset{\circ}{b}$ ($=\overset{\circ}{a}-\overset{\circ}{b}$), as shown in FIG. 7, vector $\overset{\circ}{c}$ appears at the collector of the transistor $Q_{39}$, and vector $\overset{\circ}{b}$ appears at the collector of the transistor $Q_{43}$. Let vector $\overset{\circ}{a}$ be the reference phase, here. Then, vector $\overset{\circ}{c}$ is regarded as having a phase of +45°, and vector $\overset{\circ}{b}$ as having a phase of −45°. Thus, $|\overset{\circ}{b}|=|\overset{\circ}{c}|$. In the differential amplifier of double balanced type constituted by the transistors $Q_{47}$ to $Q_{50}$ the amplitude ratio between vectors $\overset{\circ}{b}$ and $\overset{\circ}{c}$ is controlled by the variable resistor $VR_2$. Further, vectors b and c are synthesized into a signal, which is applied to the base of the transistor $Q_{15}$. The phase of this signal may thus range from −45° to +45° with respect to vector $\overset{\circ}{a}$. A burst signal with a controlled phase and a chrominance signal having its amplitude controlled by transistor $Q_{14}$ are synthesized at the base of the transistor $Q_{15}$ into a signal. The signal thus obtained is supplied from the emitter of the transistor $Q_{15}$ to the circuit in the next stage through an AC coupling capacitor $C_3$.

As mentioned above, in the signal-processing circuit according to this invention the number of the necessary AC coupling capacitors which serve to reduce the offset of DC coupling among the various circuits. Thus the number of the terminal pins of the signal-processing circuit is reduced proportionally. The signal-processing circuit is therefore made into an integral circuit more easily than otherwise. In addition, since the number of AC coupling capacitors is reduced, the signal-processing circuit can be manufactured at a lower cost.

What is claimed is:

1. A composite color signal-processing circuit for processing a time-shared composite color signal including burst and chrominance signals, comprising:
    an integrated circuit including
        a gate circuit for separating and extracting said burst signal and said chrominance signal from said time-shared composite color signal;
        a gain control circuit coupled to said gate circuit for controlling the gain of said chrominance signal; and
        a common inactive load for combining said burst signal, without regenerating, with said gain controlled chrominance signal to form a second time-shared signal the combining of chrominance and phase-controlled burst signals in a common inactive load reducing any DC level difference therebetween; and
    an AC coupling capacitor for delivering said second time-shared signal from said common load, said coupling capacitor removing any DC component of said combined chrominance and phase-controlled burst signals.

2. A composite color signal-processing circuit for processing a time-shared composite color signal including burst and chrominance signals, comprising:
    an integrated circuit including
        a gate circuit for separating and extracting said burst signal and said chrominance signals;
        a phase control circuit coupled to said gate circuit for controlling the phase of said burst signal;
        a common inactive load for combining said chrominance signal with the phase controlled burst signal, without regeneration, from said phase control circuit to form a second time-shared signal the combining of chrominance and phase-controlled burst signals in a common inactive load reducing any DC level difference therebetween; and
    an AC coupling capacitor for delivering said second time-shared signal from said common load said coupling capacitor removing any DC component of said combined chrominance and phase-controlled burst signals.

3. A composite color signal-processing circuit for processing a time-shared composite color signal including burst and chrominance signals, comprising:
    an integrated circuit including
        a gate circuit for separating and extracting said burst signal and said chrominance signal from said time-shared composite color signal;
        a gain control circuit coupled to said gate circuit for controlling the gain of said chrominance signal;
        a phase control circuit coupled to said gate circuit for controlling the phase of said burst signal; and
        a common inactive load for combining the phase controlled burst signal, without regeneration, from said phase control circuit with the gain controlled chrominance signal from said gain control circuit to form a second time-shared signal the combining of chrominance and phase-controlled burst signals in a common inactive load reducing any DC level difference therebetween; and
    an AC coupling capacitor for delivering said second time-shared signal from said common load, said coupling capacitor removing any DC component of said combined chrominance and phase-controlled burst signals.

4. A composite color signal-processing circuit according to any one of claims 1 to 3, further including:
    a first phase detector coupled to said coupling capacitor for detecting the burst signal component of said second time-shared signal in response to a gate pulse;
    a second phase detector coupled to said coupling capacitor for detecting the chrominance signal component of said second time-shared signal in response to a gate pulse; and
    a means for DC coupling an output end of said AC coupling capacitor to said first and second phase detectors.

5. A composite color signal-processing circuit according to claim 4, wherein said first and second phase detectors are respectively phase detectors of a voltage controlled oscillator and a demodulator and are adapted to cooperate under the control of said gate circuit.

6. A composite color signal-processing circuit for processing a time-shared composite color signal including burst and chrominance signals, comprising:
    an integrated circuit including
        a phase delay circuit for controlling the phase of said composite color signal;
        a first differential amplifier having a first input coupled to said composite color signal and a second input coupled to a phase delay output of said phase delay circuit;
        means for amplifying the phase delay output of said phase delay circuit;
        a double balanced differential amplifier having a first input coupled to an output difference signal of said first differential amplifier and a second input coupled with an output signal of said amplifying means;
        a gain control circuit for extracting a chrominance signal from said composite color signal and controlling the gain of said chrominance signal in response to a gate pulse applied thereto;

a common load for combining the output of said double balanced type differential amplifier with the output of said gain control circuit; and an AC coupling capacitor coupled to said common load for delivering a time-shared composite color signal from said common load.

7. A composite color signal-processing circuit according to claim 6, wherein said gain control circuit comprises a second differential amplifier having a first input coupled to receive a gate pulse and a second input coupled to receive a reference voltage, a third differential amplifier for controlling the gain of one output of said second differential amplifier, a current source for supplying constant current to said second differential amplifier, and means for coupling to said common load the other output of said second differential amplifier and the output of said third differential amplifier.

* * * * *